(12) United States Patent
Meece et al.

(10) Patent No.: US 6,585,460 B1
(45) Date of Patent: Jul. 1, 2003

(54) DRILL HAVING MACHINE GRINDABLE CUTTING EDGE

(75) Inventors: Roy D. Meece, New Trenton, IN (US); James A. Baird, Jr., Amelia, OH (US); Gerald R. Geverdt, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 09/711,560

(22) Filed: Nov. 13, 2000

(51) Int. Cl.[7] ............................................. B23B 51/02
(52) U.S. Cl. ..................... 408/230; 76/108.6; 408/227; 451/48
(58) Field of Search ................................ 408/227, 229, 408/230; 451/48; 76/108.6, 108.1, 115

(56) References Cited

U.S. PATENT DOCUMENTS

| | | | | |
|---|---|---|---|---|
| 2,371,676 A | * | 3/1945 | Coyne | 408/230 |
| 4,605,347 A | * | 8/1986 | Jodock et al. | 408/224 |
| 4,826,368 A | * | 5/1989 | Tikal et al. | 408/225 |
| 4,898,503 A | * | 2/1990 | Barish | 408/230 |
| 5,088,863 A | | 2/1992 | Imanaga et al. | 408/230 |
| 5,230,593 A | | 7/1993 | Imanaga et al. | 408/230 |
| 5,423,640 A | * | 6/1995 | Lindblom et al. | 408/227 |
| 5,609,447 A | * | 3/1997 | Britzke et al. | 408/144 |
| 5,716,172 A | | 2/1998 | Nakamura et al. | 408/230 |
| 5,846,035 A | | 12/1998 | Karafillis et al. | 408/1 R |

FOREIGN PATENT DOCUMENTS

| | | | | |
|---|---|---|---|---|
| DE | 3936747 A1 | * | 5/1991 | 408/230 |
| JP | 92019 A | * | 4/1989 | 408/230 |
| JP | 25308 A | * | 1/1992 | 408/230 |

OTHER PUBLICATIONS

Mitsubishi Carbide, "MZS and MZE Type Drilling Systems," (199?), pp. 172, 174, 176–77.

Mitsubishi Carbide, "Solid Carbide Drill MZS Type," *Operating Instructions*, (199?), 2 pages.

* cited by examiner

*Primary Examiner*—Daniel W. Howell
(74) *Attorney, Agent, or Firm*—V G Ramaswamy; Hasse Guttag & Nesbitt LLC; Eric W. Guttag

(57) ABSTRACT

A drill having a cutting edge that is less prone to chipping or fracturing when used in drilling operations, and that can be sharpened or resharpened uniformly and consistently from drill to drill by machine grinding. The drill comprises a body and at least one flute formed in the body that terminates in a cutting edge at the cutting end of the drill. The flute has a cutting surface, the cutting surface having formed therein a dub face having a substantially planar surface over at least a portion thereof that is proximate to the cutting edge. The cutting edge has formed therein a cutting land having a substantially planar surface over at least a portion thereof connected at an edge to the planar surface portion of the dub face.

19 Claims, 4 Drawing Sheets

DRILL HAVING MACHINE GRINDABLE CUTTING EDGE

BACKGROUND OF THE INVENTION

The present invention relates generally to drills and more particularly to drills of the twist or spiral type having a cutting edge that can be sharpened or resharpened by machine grinding.

Twist or spiral drills have been developed for used in many types of drilling applications. See, for example, U.S. Patent (Karafillis et al), issued Dec. 8, 1998. Twist drills typically have a cylindrical body, a pair of helical or spiral grooves or flutes formed in the outer peripheral surface of the body and a pair of lands each disposed between the pair of flutes. Each flute has a wall or face that is usually concavely shaped. The portion of the wall of each flute facing in the direction of rotation of the drill body (the cutting face) terminates at its forward end (the drill point) in a cutting edge or lip.

Twist drills can be used in heavy-duty operations such as drilling materials used in aerospace or jet engine components. The materials used in these components are often formed from high temperature alloys such as nickel-based alloys. The cutting edge of the drill used in drilling such high temperature alloys can become dull over time and can require regrinding to sharpen the cutting edge. Also, because of the stress that the cutting edge is subjected to during drilling, the cutting edge can become chipped or fractured, thus also requiring regrinding of the drill.

To lengthen the time before regrinding of the cutting edge of the drill is required and to minimize the occurrence of chipping or fractures, the cutting edge of the drill can be honed across its surface. Previously, this honed edge has been manually created by using a diamond file to form a planar surface in the cutting edge. However, manual honing requires special skills for the one carrying it out and does not provide a uniform and consistent honed surface from drill to drill. In particular, it is difficult to manually hone a relatively straight, planar surface in the cutting edge. It is especially difficult to make these manually honed edges consistent for each of the pair of cutting edges in a standard twist drill. This can again make the cutting edges more prone to chipping or fracture because of the uneven stress that the cutting edges are subjected to during the drilling operation.

In order to make the honed surface in the cutting edge straighter and more consistent from drill to drill, it would be desirable to form this honed surface in the cutting edge by machine grinding, especially by using a computerized numerically controlled (CNC) grinding machine. However, machine grinding of the cutting edge to formed this honed surface (referred to hereafter as a "cutting land") can be difficult, especially since there are typically slight inaccuracies in the flute spacing of the drill. As a result, CNC machine grinding of this cutting land into the cutting edge of the drill within tightly controlled dimensions is typically not possible.

Accordingly, it would desirable, therefore, to provide a twist or spiral drill that has a cutting land in the cutting edge that can be formed uniformly and consistently from drill to drill by machine grinding, preferably using a CNC grinding machine, even if there are slight inaccuracies in the flute spacing of the drill.

SUMMARY OF THE INVENTION

The present invention relates to a drill having a cutting end. The drill includes a body and at least one flute formed in the body. A dub face is formed adjacent a surface of the flute and proximate the cutting end of the drill. The dub face has a substantially planar surface portion. The drill includes a cutting land, and a cutting edge associated with the cutting land. The cutting land has a substantially planar surface over at least a portion thereof, the planar surface portion of the cutting land being connected at an edge to the planar surface portion of the dub face. The cutting edge is spaced from the dub face by the cutting land.

The present invention further relates to a method for machine grinding the cutting edge of the drill to form the cutting land. In this method, the dub face is formed in a surface of the flute of the drill proximate the cutting end of the drill, the dub face having a substantially planar surface over at least a portion thereof, the planar surface portion of the dub face being connected at an edge to the surface of the flute. After the dub face is formed, a drill cutting edge and cutting land are machine ground to form a cutting land having a substantially planar surface over at least a portion thereof, such that the planar surface portion of the cutting land is connected at an edge to the planar surface portion of the dub face, and such that the cutting edge is spaced from the dub face by the cutting land.

Forming the dub face in the surface of the flute of the drill allows the cutting land to be formed in association with cutting edge by machine grinding, including CNC machine grinding, uniformly and consistently from drill to drill. As a result, the cutting edge of the drill of the present invention is less prone to chipping or fracturing when used in drilling operations involving high temperature metal alloys and can be sharpened or resharpened uniformly and consistently by machine grinding. Indeed, the present invention allows the cutting land to be repeatedly formed uniformly and consistently, including CNC machine grinding, within tightly controlled dimensions, even if there are slight inaccuracies in the flute spacing of the drill.

DETAILED DESCRIPTION OF THE INVENTION

Figure 1:
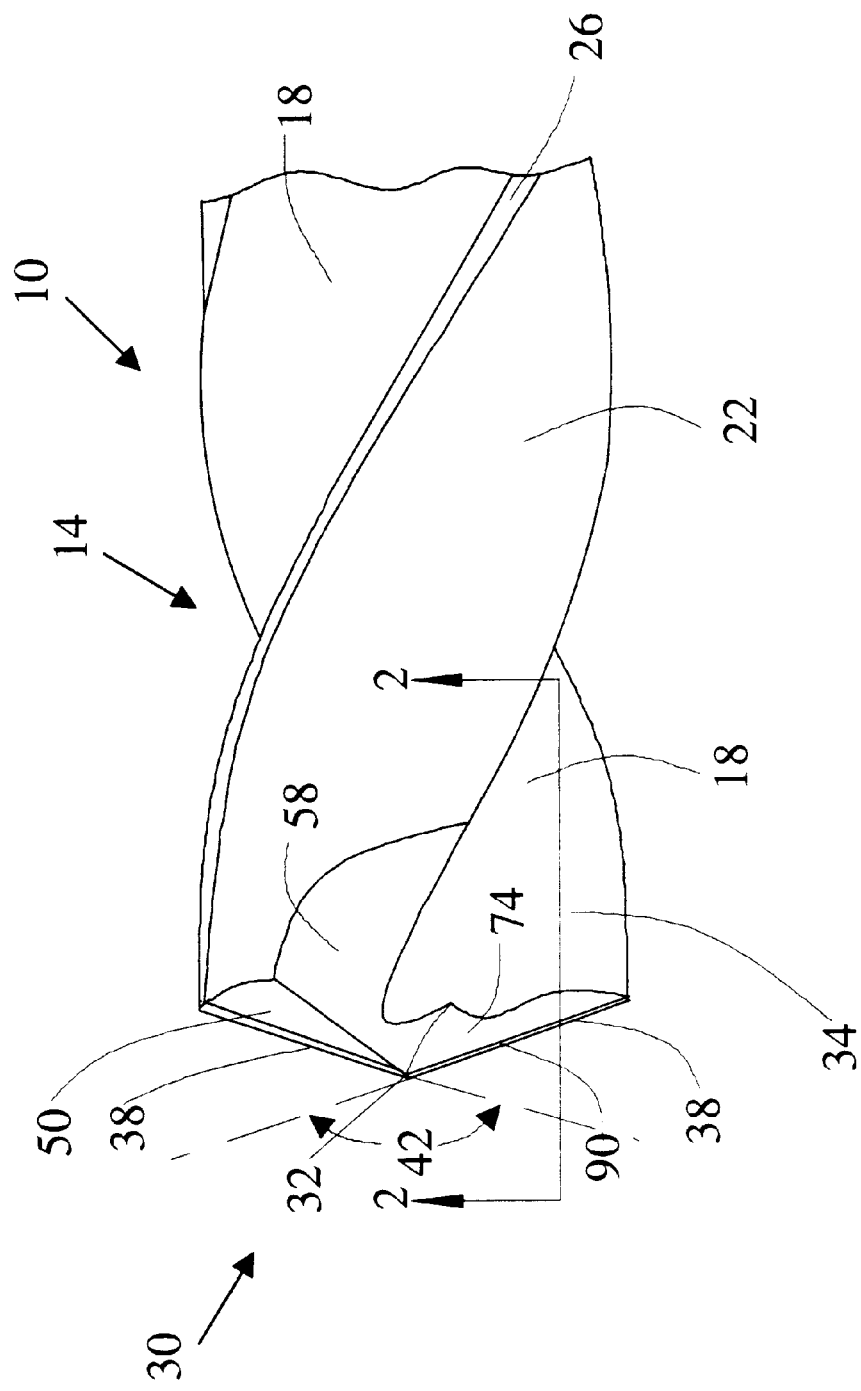
FIG. 1 is a partial side view of an exemplary embodiment of the drill of the present invention.

Referring to the drawings, FIG. 1 illustrates an exemplary embodiment of the drill of the present invention referred to generally as 10. Although not shown, 10 drill usually includes a shank typically having a cylindrical cross section at one end thereof (the shank end of the drill) that is gripped by a rotating device to drive drill 10. Drill 10 has a body indicated by 14 that has formed therein flutes 18 to permit the removal of chips of material that are drilled out of the work piece. Drill 10 can include any desired number of flutes 18, for example two, three, or four in the form of spiral or helical grooves in body 14. The exemplary embodiment of drill 10 shown in drawings has a pair of such flutes 18 that are formed in body 14 to form a double helix.

Body 14 includes what is conventionally known as a land 22 which is the portion of the drill body between adjacent flutes 18. Between and connected to land 22 and flute 18 is a margin 26 along the outer periphery of drill 10.

Figure 3:
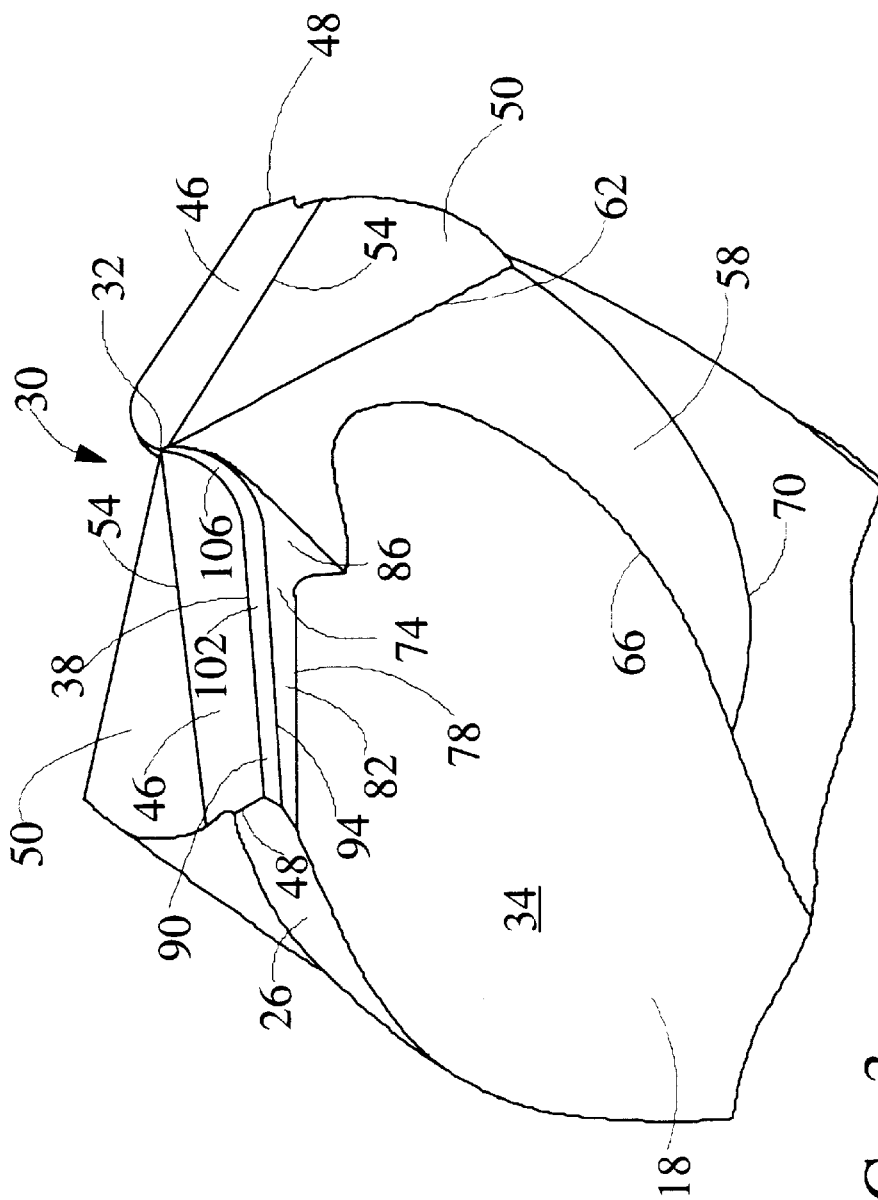
FIG. 3 is partial perspective view of the drill of FIG. 1.

As shown in FIGS. 1 and 3, flute 18, land 22 and margin 26 extend generally from the shank end of drill 10 towards the other end of the drill (the "cutting end") which is indicated by 30 and which terminates in drill point 32. The wall of flute 18 has a cutting surface 34 that terminates at the cutting end 30 of the drill in a cutting edge indicated by 38.

As particularly shown in FIG. 1, the angle indicated by 42 that is included between the planes defined by cutting edges 38 at the cutting end 30 of the drill is conventionally referred to as the "point angle." The point angle 42 is less than about 180°, and is usually in the range of from about 100 to about 160°, more typically from about 135 to about 150°. While the FIGS., especially FIG. 3, of the drawings show drill 10 with what is referred to as a rolled notched point, other types of drill points, such as single-angle points, double-angle points, reduced rake points, helical points, multi-facet points, and rounded edge points can be used in exemplary embodiments of the invention. Various types of drill points are described, for example, in Tool and Manufacturing Engineer's Handbook, Vol. 1, Chapter 9, Society of Manufacturing Engineers (Thomas J. Drozda & Charles Wick eds., 4.sup.th ed. 1983).

Figure 4:
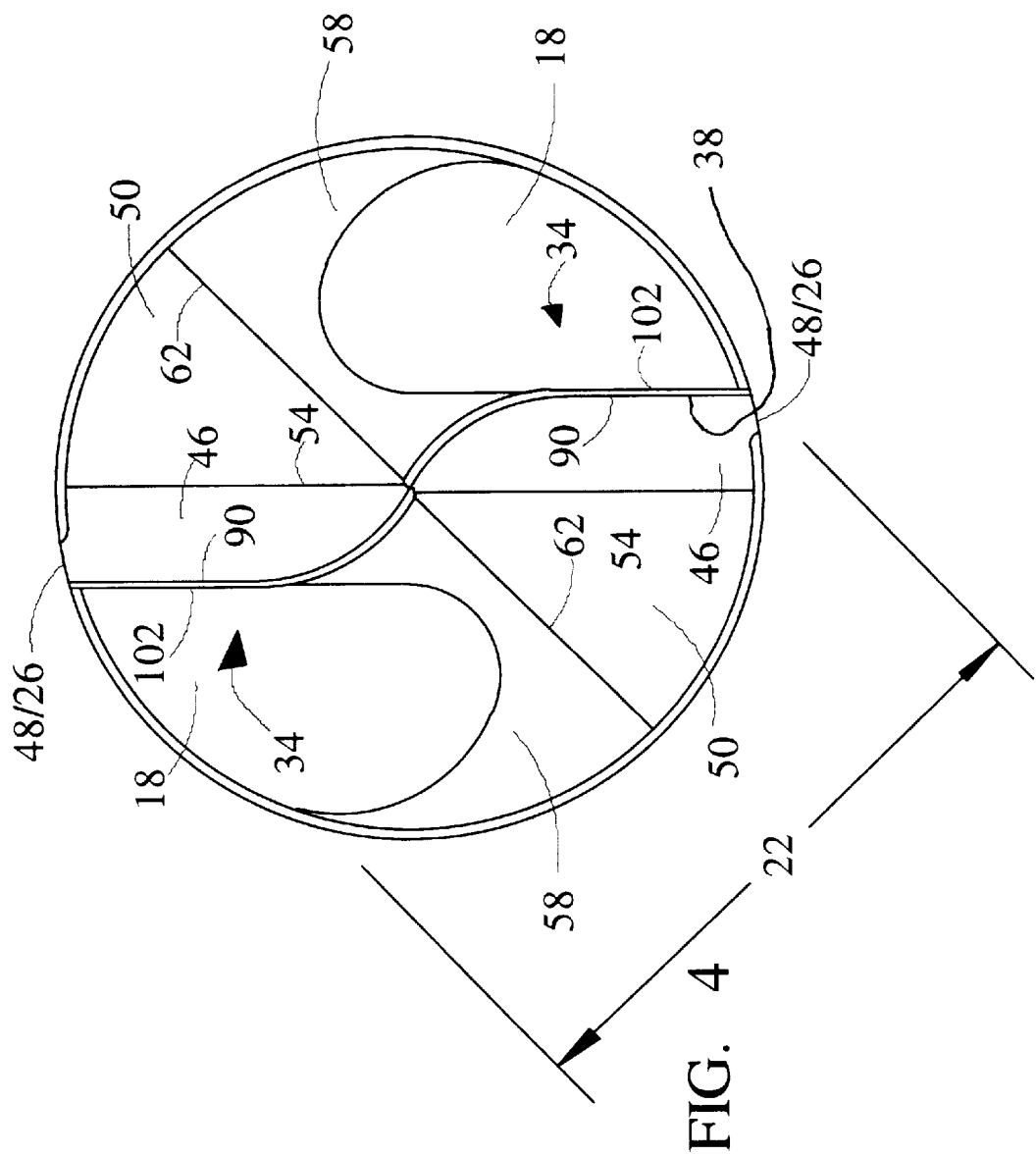
FIG. 4 is view showing the cutting end of the drill of FIG. 1.

As can be seen more clearly in FIGS. 3 and 4, cutting edge 38 extends generally inwardly from the outer perimeter or diameter of cutting end 30 of drill to drill point 32. As also best illustrated in FIGS. 3 and 4, the cutting end 30 of drill 10 includes three pairs of substantially planar faces 46, 50 and 58. The first pair of planar faces 46 (conventionally referred to as "flank faces" or "primary clearance faces") each extend generally inwardly from the outer perimeter or diameter of the cutting end 30 of the drill to meet at drill point 32 that is substantially in the center of the drill 10. One side of planar faces 46 intersects the margin 26 at edge 48. The second pair of planar faces 50 (conventionally referred to as "secondary clearance faces") are adjacent to the first pair of planar faces 46, meeting at an edge 54. The third pair of planar faces 58 (conventionally referred to as "gashes") are adjacent to the second planar faces 50, meeting at an edge 62. The third planar faces 58 also intersect flutes 18 at curved edge 66, as well as land 22 at edge 70.

The relief angle (the angle between the planar face and a plane normal to the drill rotation axis) of the first planar faces 46 is typically less than the relief angle of the second planar faces 50 which is typically less than the relief angle of the third planar faces 58. The relief angle of the first planar faces 46 is less than about 15°, and is usually in the range of from about 8 to about 14°, more typically from about 10 to about 12°. The relief angle of the second planar faces 50 is less than about 40°, and is usually in the range of from about 20 to about 35°, more typically from about 25 to about 30°. The relief angle of the third planar faces 58 is less than about 65°, and is usually in the range of from about 45 to about 63°, more typically from about 50 to about 58°.

As best illustrated in FIG. 3, the cutting surface 34 has formed therein a dub face 74. Dub face 74 forms an edge 78 with surface 34 of flute 18, and has a straight, substantially planar surface portion 82 that extends generally inwardly from the outer perimeter or diameter of the cutting end 30 of drill 10 and a curved surface portion 86 that extends from planar surface portion 82 generally inwardly towards, but not completely to, drill point 32.

As also shown particularly in FIG. 3, a cutting land 90 is formed adjacent to cutting edge 38. Cutting land 90 meets dub face 74 at edge 94 and primary clearance face 46 at cutting edge 38. Cutting land 90 has a straight, substantially planar surface portion 102 that extends generally inwardly the outer perimeter or diameter of the cutting end 30 of drill 10 and a curved surface portion 106 that extends generally inwardly from the planar surface portion 102 to point 32 of drill 10. Indeed, the reason curved surface portion 86 of dub face 74 does not extend completely to drill point 32 is so that the curved surface portion 106 of cutting land 90 can be formed to extend generally inwardly to meet drill point 32.

The width of dub face 74 from edge 78 to edge 94 can vary depending on the degree of the spiral of flute 18. (Typically, the degree of spiral of flute 18 is in the range from about 0 to about 40°.) Accordingly, the particular width of dub face 74 is usually not critical as long as it is sufficient to allow for the formation of cutting land 90 by machine grinding to form cutting edge 38. However, as dub face 74 becomes wider, more of margin 26 is typically removed during formation of the dub face which can be undesirable. Usually, the width of dub face 74 is at least about 2 mils (0.051 mm) and is typically within the range of from about 2 to about 15 mils (from about 0.051 to about 0.38 mm) and is measured at the intersection of dub face 74 with margin 26 after the cutting land 90 is formed.

The width of land 90 from edge 94 to cutting edge 38 can vary depending on the cutting diameter of drill 10 (i.e., the diameter that the outer perimeter of cutting edges 38 sweep at the cutting end 30 as the drill rotate. In particular, the width of land 90 should be greater than the chip load of the drill (i.e., the axial depth that the drill rotates per cutting edge 38 per rotation.) For drills having cutting diameters of from about 92 to about 875 mils (from about 2.3 to about 2.2 mm), the chip load is typically from about 1.5 to about 2 mils (from about 0.038 to about 0.051 mm). This means that the width of land 90 should be at least about 3 mils (0.076 mm) so that it can handle such chip loads. Typically, the width of land 90 is from about 3 to about 6 mils (from about 0.076 to about 0.15 mm) for drills having the above indicated cutting diameters.

Figure 2:
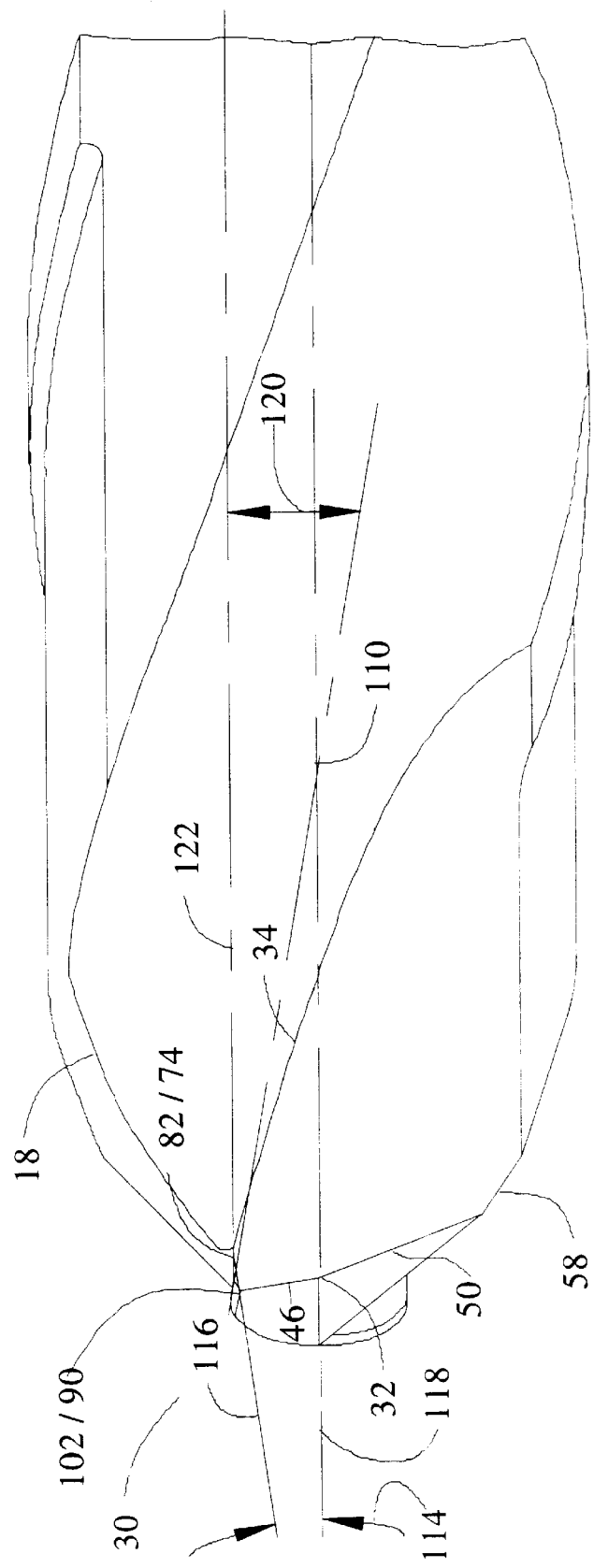
FIG. 2 is a section taken along line 2—2 of FIG. 1.

Referring to the side sectional view in FIG. 2, planar surface portion 102 of cutting land 90 forms what is referred to hereafter as a "negative axial rake angle" relative to the drill rotation axis indicated by line 110 that extends through and beyond drill point 32. This negative axial rake angle is indicated by 114 and is formed by extending a plane indicated by 116 from planar surface portion 102 outwardly until it intersects the plane passing through the drill rotation axis 110 extended beyond drill point 32 as indicated by 118 and as measured at the intersection of cutting land 90, dub face 74 and margin 26. This negative axial rake angle 114 can be in the range from about 20 to about 40°, and more typically from about 25 to about 35°. As also particularly shown in FIG. 2, planar surface portion 82 of dub face 74 is either parallel to (i.e., forms a 0° angle) or forms what is referred to hereafter as a slight "positive axial rake angle" relative to drill rotation axis 110. This positive axial rake angle is indicated by 120 and is formed by extending a plane indicated by 122 from planar surface portion 82 inwardly away from the cutting end 30 of drill 10 (i.e., towards the shank end the drill) until it intersects (if it is not parallel to) drill rotational axis 110. This angle 120 can be in the range from 0 to about 5°, more typically from 0 to about 2°.

In sharpening or resharpening drill 10, the primary purpose in forming dub face 74 is to allow the grinding machine to follow or trace over the planar surface portion 82 and curved surface portion 86 of dub face 74 from the outer perimeter of cutting end 30 of drill 10 to drill point 32 so as to uniformly and consistently form the planar surface portion 102 and the curved surface portion 106 of cutting land 90 adjacent to cutting edge 38. An embodiment for sharpening or resharpening drill 10 is described as follows, preferably using a computerized numerically controlled (CNC) grinding machine, such as a SE Huffman HS-48 CNC grinding machine: Dub face 74, as well as the third planar (gash) face 58, is typically initially formed by machine grinding using the following steps: The straight portion of surface 34 of drill 10 is positioned vertically as shown FIG. 4. The grinding surface of the grinding machine, typically a dish-shaped grinding wheel, is then set to approach the surface 34 at the desired relief angle for gash face 58. The grinding wheel is then moved along surface 34 from the outer perimeter of the cutting end 30 of drill 10 so as to form the planar surface portion 82 of the dub face 74 with the desired positive axial rake angle 120. Drill 10 is then rotated clockwise (as viewed in FIG. 4 from the cutting end 30) about its rotation axis 110, while at the same time the grinding wheel is moved (rolled) towards, but not completely to, drill point 32 by either moving the cutting end 30 of drill 10 or the grinding wheel (or both) horizontally or sideways to form the curved surface portion 86 of dub face 74 in the surface 34 of flute 18. The grinding wheel is then moved outwardly from drill point 32 to the outer perimeter of the cutting end 30 of drill 10 by moving the grinding wheel, cutting end 30 of the drill or both, so that the grinding wheel moves across the cutting end 30 to grind it and form gash face 58 in a manner understood by those skilled in the art.

After dub face 74 and gash face 58 are formed, the point angle 42, the second planar (secondary clearance) face 50, and the first planar (primary clearance) face 46 are then typically formed by machine grinding as follows: The drill point 32 of drill 10 is positioned so that the grinding wheel can be brought into contact with the cutting end 30 of the drill to grind and form cutting edges 38 having the desired point angle 42 in a manner understood by those skilled in the art. The grinding wheel is then moved across the cutting end 30 to form the secondary clearance face 50 having the desired relief angle in a manner understood by those skilled in the art. After the relief angle for secondary clearance face 50 is formed, the grinding wheel is then moved across the cutting end 30 to form the primary clearance face 46 having the desired relief angle in a manner understood by those skilled in the art.

After the point angle 42, the secondary clearance face 50, and the primary clearance face 46 are formed, cutting land 90 is typically then formed adjacent cutting edge 38 by machine grinding as follows: The upper cutting edge 38 of drill 10 is positioned vertically as shown FIG. 4. The grinding wheel is then set to approach the cutting edge at an angle of approximately 45° above the corner where cutting edge 38 intersects margin 26. The cutting end 30 of the drill is then adjusted to the appropriate negative tilt axis such that the grinding wheel creates an elliptical curve at the point that the grinding wheel surface contacts cutting edge 38 and thus forms the desired negative axial rake angle 114 for the planar surface portion 102 of cutting land 90. For example, positioning the cutting end 30 at approximately a negative tilt axis of 14° will form a negative axial rake angle 114 for planar surface portion 102 of cutting land 90 of approximately 30°. Using a CNC grinding machine with three-linear axis motion, the grinding wheel is then moved from the outer perimeter of cutting end 30 inwardly towards drill point 32 along cutting edge 38, with the grinding wheel edge following or tracing along the planar surface portion 82 of dub face 74, to form planar surface portion 102 of cutting land 90. After forming planar surface portion 102 of cutting land 90, and while still in contact with the grinding wheel at the tangent of surface portion 82 and 36, drill 10 is then rotated clockwise about rotation axis 110 while the grinding wheel edge follows or traces inwardly along the curved surface portion 86 of dub face 74 to drill point 32 to form curved surface portion 106 of cutting land 90.

Drill 10 can be fluid cooled by flood cooling, i.e., by projecting a stream of fluid coolant at the drill above the hole during drilling. More typically, drill 10 is fluid cooled by forming conduits in the body 14 of the drill that have exit holes at the cutting end of the drill and then supplying fluid coolant through these conduits. Drill 10 can also be formed with what is referred to as a "back taper" where the drill diameter is wider at the cutting end 30 when compared to the drill diameter towards the shank end, i.e. the drill is tapered from the cutting end towards the shank end.

While specific embodiments of the present invention have been described, it will be apparent to those skilled in the art that various modifications thereto can be made without departing from the spirit and scope of the present invention as defined in the appended claims.

What is claimed is:

1. A drill having a cutting end, the drill comprising:
   (a) a body and at least one flute formed in the body;
   (b) a dub face formed adjacent a surface of the flute and proximate the cutting end of the drill, the dub face having a substantially planar surface over at least a portion thereof, the width of said dub face being no greater than about 15 mils;
   (c) a cutting land having a substantially planar surface over at least a portion thereof, the planar surface portion of the cutting land being connected at an edge to the planar surface portion of the dub face; and
   (d) a cutting edge, the cutting edge spaced from the dub face by the cutting land.

2. The drill of claim 1 wherein the cutting end terminates in a drill point and wherein the cutting edge and the cutting land extend generally inwardly from the outer perimeter of the cutting end to the drill point, the cutting land having a curved surface portion extending inwardly from the planar surface portion of the cutting land to the drill point.

3. The drill of claim 2 which has a point angle at the cutting end of less than about 180°, and wherein the cutting end of the drill further comprises a substantially planar primary clearance face that extends generally inwardly from the outer perimeter of the cutting end to the drill point, the primary clearance face being connected at an edge to the planar surface portion of the cutting land and having a relief angle of less than about 15°.

4. The drill of claim 3 wherein the point angle is in the range of from about 110 to about 160° and wherein the relief angle of the primary clearance face is in the range of from about 8 to about 14°.

5. The drill of claim 4 wherein the planar surface portion of the cutting land has a width from the edge at the primary clearance face to the edge at the planar surface portion of the dub face of at least about 3 mils.

6. The drill of claim 1 wherein the width of the planar surface portion of the cutting land is from about 3 to about 6 mils.

7. The drill of claim 5 wherein the planar surface portion of the cutting land has a negative axial rake angle of from about 20 to about 40°.

8. The drill of claim 7 wherein the negative axial rake angle is from about 25 to about 35°.

9. The drill of claim 7 wherein the planar surface portion of the dub face has a positive axial rake angle of from 0 to about 5° and a width from the edge at the planar surface portion of the cutting land to the edge at the surface of the flute of at least about 2 mils.

10. The drill of claim 1 comprising a pair of flutes grooved into the body to form a double helix.

11. A method for machine grinding the cutting end of a drill, the drill comprising a body and at least one flute formed in the body, the method comprising the steps of:
   (a) forming a dub face having a substantially planar surface over at least a portion thereof and a width of no greater than about 15 mils, the dub face formed in association with a surface of a flute;
   (b) after forming the dub face, machine grinding the cutting end of the drill to provide a cutting edge and a cutting land associated with the cutting edge, the cutting land having a substantially planar surface over at least a portion thereof, wherein the planar surface portion of the cutting land is connected at an edge to the planar surface of the dub face.

12. The method of claim 11 wherein the cutting end terminates in a drill point and wherein the cutting edge and the cutting land extend generally inwardly from the outer perimeter of the cutting end to the drill point, and the method comprising forming a cutting land having a curved surface portion extending inwardly from the planar surface portion of the cutting land to the drill point.

13. The method of claim 12 which further comprises step (c) of forming a point angle at the cutting end of the drill of less than about 180°, and which further comprises step (d) of forming in the cutting end a substantially planar primary clearance face that extends generally inwardly from the outer perimeter of the cutting end to the drill point, the primary clearance face being connected at an edge to the planar surface portion of the cutting land and having a relief angle of less than about 15°.

14. The method of claim 13 wherein cutting edge is machine ground during step (b) to form the planar surface portion of the cutting land so as to have a width from the edge at the primary clearance face to the edge at the planar surface portion of the dub face of at least about 3 mils.

15. The method of claim 14 wherein the drill has a cutting diameter at the cutting end of from about 92 to about 875 mils and wherein the cutting edge is machine ground during step (b) to form the planar surface portion of the cutting land so as to have a width of from about 3 to about 6 mils.

16. The method of 14 wherein the cutting edge is machine ground during step (b) to form the planar surface portion of the cutting land so as to have a negative axial rake angle of from about 20 to about 40°.

17. The method of 16 wherein the cutting edge is machine ground during step (b) to form the planar surface portion of the cutting land so as to have a negative axial rake angle of from about 25 to about 35°.

18. The method of claim 16 wherein the planar surface portion of the dub face is formed by machine grinding during step (a) so as to have a positive axial rake angle of from 0 to about 5° and a width from the edge at the planar surface portion of the cutting land to the edge at the cutting surface of the flute of at least about 2 mils.

19. The method of claim 12 wherein the dub face has a curved surface portion that extends generally inwardly from the planar surface portion of the dub face towards the drill point and is connected at an edge to the curved surface portion of the cutting land, wherein the grinding machine has a grinding surface, and wherein during step (b) the grinding surface follows the planar surface portion of the dub face, to form the planar surface portion of the cutting land, and the curved surface portion of the dub face, to form the curved surface portion of the cutting land.

* * * * *